United States Patent [19]

Rossi et al.

[11] Patent Number: 4,578,444

[45] Date of Patent: Mar. 25, 1986

[54] ANAEROBIC ADHESIVES CONTAINING POLYMERIZABLE ACTIVATORS

[75] Inventors: Robert D. Rossi, Levittown, Pa.; Dilip K. Ray-Chaudhuri, Bridgewater, N.J.

[73] Assignee: National Starch and Chemical Corporation, Bridgewater, N.J.

[21] Appl. No.: 656,573

[22] Filed: Oct. 1, 1984

Related U.S. Application Data

[63] Continuation of Ser. No. 489,433, Apr. 28, 1983, abandoned.

[51] Int. Cl.$^4$ .......................................... C08F 228/02
[52] U.S. Cl. .................................. 526/288; 428/463; 526/270
[58] Field of Search ............... 526/288, 287, 312, 320, 526/323.1, 323.2

[56] References Cited

U.S. PATENT DOCUMENTS

| | | | |
|---|---|---|---|
| 2,895,950 | 7/1959 | Kreible | 260/89.5 |
| 3,052,656 | 9/1962 | Groene | 526/286 |
| 3,775,385 | 11/1973 | Ozono et al. | 260/79 |
| 3,957,561 | 5/1976 | Skoultchi | 156/331 |
| 4,038,475 | 7/1977 | Frauenglass et al. | 526/328 |
| 4,054,480 | 10/1977 | Skoultchi et al. | 156/331 |
| 4,215,209 | 7/1980 | Ray-Chaudhuri | 526/312 |
| 4,386,194 | 5/1983 | Gruber | 526/323.2 |

Primary Examiner—Christopher A. Henderson
Attorney, Agent, or Firm—Edwin M. Szala; Ellen T. Dec

[57] ABSTRACT

Novel anaerobic curing compositions prepared containing polymerizable (meth)acrylate monomers, free radical initiators and, as a polymerizable activators therefor, monomeric disulfonimides.

8 Claims, No Drawings

ANAEROBIC ADHESIVES CONTAINING POLYMERIZABLE ACTIVATORS

This application is a continuation of application Ser. No. 489,433, filed Apr. 28, 1983, now abandoned.

BACKGROUND OF THE INVENTION

This invention relates to novel anaerobic curing compositions containing conventional polymerizable (meth-)acrylate monomers, free radical initiators, and polymerizable activators therefor. It further relates to the use of the improved anaerobic compositions as adhesives and sealants.

Anaerobic compositions are well-known in the art. They are so formulated or treated that the compositions remain in an uncured state over long periods of time provided that the compositions are exposed to an adequate supply of air or oxygen throughout that period, but which polymerize spontaneously upon the exclusion of air or oxygen therefrom, as when placed between non-porous surfaces (e.g. metal or glass). Depending upon the exact formulation, such compositions may be used as adhesives or sealants.

These anaerobic formulations generally contain a peroxy initiator and/or benzosulfonimide (saccharin) as activator therefor. Typical of such formulations are those disclosed in U.S. Pat. Nos. 2,895,950; 3,775,385; 3,957,561; 4,054,480 and 4,038,475. The types of activator systems represented by the teachings of the prior art patents represent separate components which are merely blended into the acrylate or methacrylate based anaerobic formulation so as to provide the free radical source needed for polymerization.

It is an object of the present invention to provide a monomeric activator which can be copolymerized directly into the backbone of the acrylate or methacrylate anaerobic monomer. By incorporating such a polymerizable monomer into the anaerobic system, final adhesive compositions characterized by superior strength properties can be achieved.

SUMMARY OF THE INVENTION

Novel stable anaerobic compositions are prepared which contain, as a polymerizable activator, a monomeric disulfonimide having the general formula:

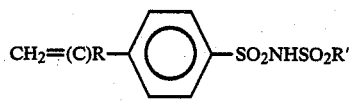

wherein R is hydrogen or methyl and R' is alkyl, aryl or substituted aryl. The compositions are formulated by conventional methods using typical acrylate or methacrylate monomers or mixtures thereof, a free radical initiator, the polymerizable activator, and preferably, but not necessarily, a stabilizer, a chelator, and/or minor amounts of acidic monomers, such as acrylic acid, methacrylic acid, and/or citraconic, itaconic, and maleic acid or their anhydrides as auxiliary accelerators as well as the other additives conventionally employed. They are useful as adhesives and sealants which, on curing, show improved performance properties. Additionally, by incorporating the activator into the polymer backbone rather than having it remain free in the anaerobic formulation, the corrosive effects of the adhesive when coated on metal surfaces are minimized.

DESCRIPTION OF THE PREFERRED EMBODIMENTS

Preparation of The Monomeric Disulfonimide Activator

The monomeric disulfonimide activators are prepared in accordance with a multi-step reaction. In the first step, a phenylalkyl halide is reacted with an excess of halosulfonic acid after which the resultant product is reacted with ammonia to form a sulfonamide. The latter two reactions are known in the art and any conventional techniques and/or reagents may be utilized. The resulting sulfonamide is then reacted with an alkyl or aryl sulfonyl chloride followed by acidification to form a halo-disulfonimide. Although any alkyl or aryl sulfonyl chloride could be used, those generally available, and hence preferred from a commercial view-point, include methansulfonyl chloride, ethanesulfonyl chloride, isopropylsulfonyl chloride, butanasulfonyl chloride, benzenesulfonyl chloride, p-toluenesulfonyl chloride, and 2-mesitylenesulfonyl chloride. The halo-disulfonimide intermediate is then subjected to dehydrohalogenation to form the monomeric disulfonimide. Further details on the preparation of these activators are disclosed in our copending U.S. Patent application, Ser. No. 489,665 filed on even date herewith now U.S. Pat. No. 4,510,324.

Preparation of The Anaerobic Composition

The monomers employed herein are the commonly known anaerobically curable monomers having at least one polymerizable acrylate ester group.

The 1st class of monomers useful herein correspond to the general formula:

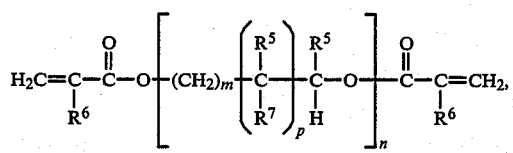

where $R^5$ is H, $CH_3$, $C_2H_5$, $CH_2OH$, or $CH_2-O-C(=O)-C(R^6)=CH_2$; $R^6$ is H, Cl, $CH_3$ or $C_2H_5$; $R^7$ is H, OH, or $O-C(=O)-C(R^6)=CH_2$; m is 1–8, preferably 1–4; n is 1–20; and p is 0–1.

Monomers typical of this class include, for example, ethyleneglycol dimethylacrylate, ethyleneglycol diacrylate, polyethyleneglycol diacrylate, tetraethyleneglycol dimethacrylate, diglycerol diacrylate, diethyleneglycol dimethacrylate, pentaerythritol triacrylate, and other polyester diacrylates and dimethcacrylates. The above class of monomers is described in U.S. Pat. No. 3,043,820 issued July 10, 1962 to R. H. Krieble.

The 2nd class of monomers useful herein correspond to the general formula:

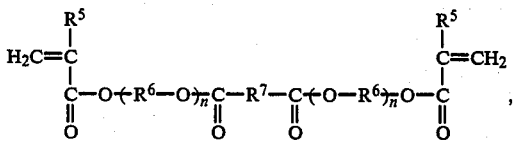

where $R^5$ is H, Cl, $CH_3$, or $C_2H_5$; $R^6$ is a $C_2$-$C_6$ alkylene; $R^7$ is $(CH_2)_m$,

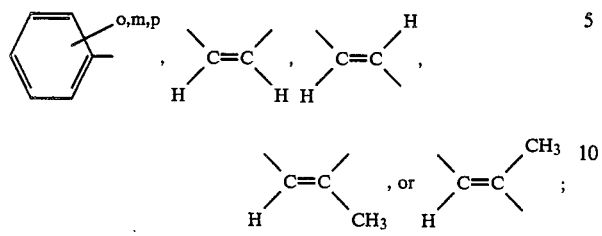

n is 1–4; and m is 0–8.

Monomers typical of this class include, for example, dimethylacrylate of bis(ethyleneglycol) adipate, dimethacrylate of bis(ethyleneglycol) sebacate, dimethyacrylate of bis(ethylenglycol) phthalate, dimethacrylate of bis(tetraethyleneglycol) maleate, and the diacrylates and α-chloroacrylates corresponding to said dimethacrylates, and the like. The above class of monomers is described in U.S. Pat. No. 3,457,212 issued July 22, 1969 to Y. Fukuoka et al.

The 3rd class of monomers useful herein are isocyanate-hydroxyacrylate or isocyanate-aminoacrylate reaction products which may be characterized as acylate-terminated polyurethanes and polyureides or polyureas. These monomers correspond to the general formula:

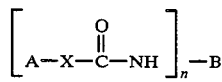

where X is O or $N(R^5)$; $R^5$ is H or a $C_1$–$C_7$ alkyl; A represents the organic residue of an active-hydrogen-containing acrylate ester wherein the active hydrogen has been removed, the ester being hydroxy- or amino-substituted on the alkyl portion thereof and the methyl, ethyl, and chlorine homologs thereof; B is a mono- or polyvalent organic radical selected from the group consisting of alkyl, alkylene, alkenyl, alkenylene, cycloalkyl, cycloalkylene, aryl, arylene, aralkyl, aralkylene, alkaryl, alkarylene, poly(oxyalkylene), poly(carboalkoxyalkylene), and heterocyclic radicals both substituted and unsubstituted; and n is 1–6.

Monomers typical of this class include for example, the reaction product of a mono- or polyisocyanate, (e.g., toluene diisocyanate or methylene bis-phenyl diisocyanate) with an acrylate ester containing a hydroxyl or amine group in the non-acrylate portion thereof, (e.g. hydroxyethyl methacrylate). The above class of monomers is described in U.S. Pat. No. 3,425,988 issued Feb. 4, 1969 to J. W. Gorman et al.

The 4th class of monomers useful herein correspond to the acrylate diesters of bis-phenol-type compounds. These monomers correspond to the general formula:

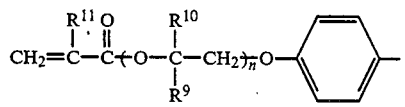

-continued

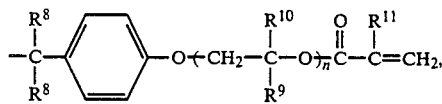

where $R^8$ is $CH_3$, $C_2H_5$, COOH, or H; $R^9$ is H, $CH_3$, or $C_2H_5$, $R^{10}$ is H, $CH_3$, or OH; $R^{11}$ is H, Cl, $CH_3$, or $C_2H_5$; and n is 0–8.

Monomers typical of this class include, for example, dimethacrylate and diacrylate esters of 4,4'-bishydroxyethoxy-bisphenol A; dimethacrylate and diacrylate esters of bisphenol A; etc. These monomers are described in Japanese Pat. Publication No. 70-15,640 of K. Orite, M. Natsume, and N. Shimada in 1970.

The 5th class of monomers consists of monofunctional acrylate and methacrylate esters and the hydroxy-, amido-, cyano-, chloro-, and silane-substituted derivatives thereof. Such monomers include, for example, methyl acrylate, methyl methacrylate, ethyl acrylate, ethyl methacrylate, hydroxyethyl methacrylate, hydroxypropyl acrylate, hydroxypropyl methacrylate, butyl acrylate, n-octyl acrylate, 2-ethylhexyl acrylate, decyl methacrylate, dodecyl methacrylate, cyclohexyl methacrylate, t-butyl methacrylate, acrylamide, N-methylolacrylamide, diactone acrylamide, N-t-butyl acrylamide, N-t-octyl acrylamide, N-butyoxyacrylamide, gamma-methacryloxypropyl trimethoxysilane, 2-cyanoethyl acrylate, 3-cyanopropyl acrylate, tetrahydrofurfuryl chloroacrylate, glycidyl acrylate, glycidyl methacrylate, and the like.

The monomers useful herein are seen to be anaerobically curable monomers having one or more polymerizable acrylate or substituted acrylate ester groups as a common, unifying characteristic. The preferred monomers are those in the 1st and 5th classes above described.

In the production of anaerobic curing adhesive compositions characterized by exceptionally high bond strength in the resultant cured polymer, the particular monomer employed may be chosen so as to contain an alcoholic, carboxylic, or other relatively polar group substituted thereof. Examples of such polar groups in addition to the hydroxyl and carboxyl groups include amino, amido, cyano, mercapto, and halogen polar groups. Monomers containing hydroxyl groups and/or labile hydrogen atoms are preferred. Examples of suitable monomers include hydroxyethyl (meth)acrylate, hydroxypropyl (meth)acrylate, diacetone acrylamide, 2-cyanoethyl acrylate, 2-chloroethyl acrylate, 2-hydroxy-3-chloropropyl methacrylate, (meth)acrylic acid, itaconic acid, citraconic acid, maleic acid, and the like. The hydroxy-containing monomers are used in amounts from about 5–95%, preferably 25–50%, and the carboxyl-containing monomers in amounts from about 0.1–15%, preferably 0.5–10%, both by weight based on the total composition weight.

For best results in terms of adhesive activity, the monomers are preferably employed in a purified state. However, the monomers may be comprised of commercial grades in which inhibitors, stabilizers, other additives or impurities may be present, provided that the activity and/or stability of the adhesive is not reduced to unacceptable levels.

In the preparation of the anaerobic curing compositions herein, it is possible to employ a mixture of acrylate ester monomers. There may also be utilized, in combination therewith, other non-acrylic, ethylenically unsaturated copolymerizable comonomers such as unsaturated hydrocarbons, unsaturated esters and ethers, vinyl esters, and the like. Typical optional comonomers include vinyl acetate, methyl vinyl ether, methyl vinyl ketone, poly(ethylene maleate), allyl alcohol, allyl acetate, 1-octene, styrene, etc. Preferably, the total optional non-acrylic monomer(s) will constitute no more than 50% by weight of the monomeric composition, and most preferably no more than 30%.

The anaerobic compositions of the invention are prepared using conventional techniques. Useful free radical initiators include hydrogen peroxide and peroxy compounds such as organic hydroperoxides (e.g. cumene, t-butyl, and methylethyl ketone hydroperoxides), peroxides (e.g. benzoyl, cyclohexyl, and hydroxycyclohexyl peroxides), and peresters (e.g. t-butyl perbenzoate and t-butyl peracetate; diazosulfones; alphaamino sulfones (e.g. N-(o- or p-carboethoxyphenyl)-(p-tolylsulfonemethyl) amine); or azo compounds (e.g. 2,2'-azobis(isobutyronitrile). Alternatively, anaerobic systems may be prepared which do not require peroxy initiators but wherein the necessary active oxygen is generated in situ.

The activators disclosed herein are added to the anaerobic formulation in amounts conventional in the art, i.e. on the order of about 0.01 to 12% dry weight of the total composition. While the monomeric disulfonimides provide best results when used as the sole activator in the anaerobic formulations, it is also within the scope of the invention to add, in addition, known activators such as saccharin and the sulfonamides of the prior art.

In order to improve the storage stability of the composition, it is preferable, but not necessary, that the composition contain a stabilizer such as an inhibitor of free radical polymerization. Suitable inhibitors include those conventionally employed, such as hydroquinones, benzoquinone, naphthoquinone, p-t-butyl catechol, phenothiazine, sterically hindered phenols, etc. The amount of inhibitor employed depends, for example, on the type of monomer used, as well as the free radical initiator used. Generally, it ranges from 0.0001 to 0.1% by weight, based on monomer, preferably 0.0025 to 0.05%. While the monomer will normally be obtained with a certain amount of inhibitor present therein, additional inhibitor may be added as necessary at any time to bring the amount up to the required level. In the case where the monomer is subjected to elevated temperatures, the required amount of inhibitor should be present prior to heating of the mixture.

The presence of a chelating agent (chelator) is also preferable, but not necessary, and it provides the compositions herein with better stability. The chelator is defined, herein, as a compound capable of complexing with a metal atom through coordination bonds between the metal and the ligand atoms of the chelator to form a hetereocyclic ring. Although many chelating agents are suitable, the preferred chelators are oxalic acid and those compounds having a combination of oxygen and nitrogen ligand atoms such as hydroxyquinoline and the and β-aminocarboxylates such as tetrasodium ethylenediamine tetracetic acid (Na$_4$ETDA). In general, the chelator useful herein should preferably be soluble in the monomer.

An example of a type of chelator which is not useful herein is the class where all ligand atoms are nitrogen, for example, dipyridyl (see U.S. Pat. No. 4,038,475 issued July 26, 1977 to E. Freunglass et al.).

The amount of chelator employed depends mainly on the type of chelator, but also to a minor extent on the amounts and types of other ingredients in the composition. Amounts from about 0.0001% to about 0.1% by weight of the total composition may be employed, depending upon the particular chelator added. It is noted that with certain chelators, the amount thereof must not exceed about 0.01% by weight to obtain an adhesive having good properties. When these chelators are added in amounts above this limit, the bond strength of the adhesive decreases dramatically. The practitioner will readily discover which chelators may be added in which amounts to best advantage. The lower limit of chelator is determined by the minimum stability desired in the composition. Preferred amounts of chelator range from 0.001 to 0.02% by weight.

Since the initiator, inhibitor, and chelator employed herein are generally very soluble in the acrylate- and methacrylate-based monomers, it is usually unnecessary to employ a solvent or diluent in order to produce a satisfactory anaerobic composition. If, however, the presence of a solvent is desired, then any solvent or diluent which dissolves the initiator, inhibitor, and chelator, as well as any accelerators which may be present and are soluble in the monomer, may be employed. Common solvents are described in the literature and include, for example, alkanols such as methanol, ethanol and butanol, ketones, substituted and unsubstituted formamides such as formamide and N,N-dimethyl formamide, and polyester diluents.

In the production of the novel anaerobic curing compositions herein it may also be desirable to employ conventional antioxidants to prolong the shelf life of the composition further. In particular, it may be preferred to add a sterically hindered phenol, e.g. butylated hydroxytoluene (BHT), butylated hydroxyanisole (BHA), or such antioxidants as are commercially available under the registered trademarks IONOX 220 (Shell), SANTONOX R (Monsanto), IRGANOX 1010, and IRGANOX 1076 (Ciba-Geigy).

The compositions of this invention may also incorporate, as auxiliary accelerators of polymerization, organic acids, preferably organic monocarboxylic acids such as benzoic acid, para-toluic acid or naphthyl acetic acid, or their corresponding anhydrides. Anhydrides of dibasic aromatic aromatic acids, such as phthalic or terephthalic acid, may also be used. Aliphatic acids, are, in general, less satisfactory as accelerators for the compositions herein when the compositions are employed on many nonferrous metal surfaces. However, these acids have some utility when the compositions are employed on ferrous metals and may conveniently be employed in conjunction with aromatic acids for bonding non-ferrous surfaces.

There may also be present in the compositions plasticizers such as, for example, dibutyl or dioctyl phthalates, triethylene glycol, or polyethylene glycol dilaurate. Tackifying resins, such as styrene/alphamethylstyrene copolymer (trademark Kristalex of Hercules), and inorganic thickeners are not usually needed, but may be included if desired. Other optional ingredients include adhesive agents, and cut-glass fibers, as well as visible dyes or ultraviolet fluorescent dyes and/or fluorescent agents. The dyes serve to increase the visibility of the normally colorless or very pale compositions so that treated surfaces can be readily distinguished from untreated surfaces. Typical dyes include those of the anthraquinone series such as 1,4-dimonomethylaminoan- .thraquinone. Dyestuffs containing unsubstituted hydroxyl groups or unsubstituted amino groups are in general to be avoided, since they exert a marked inhibiting influence on the polymerization of the compositions.

Depending on the particular ingredients and the temperature and time allowed for heating and/or stirring, the composition herein may be stored at room temperature for periods of months and in some cases even years prior to actual use without any evidence of gelling. It is only necessary that there be present a moderate amount of air or oxygen which is provided conveniently by a small volume of air in a properly shaped container, preferably made of polyethylene or a similar material which is permeable to air. However, upon exclusion from air by placement between adjacent surfaces, the composition will rapidly polymerize to form a strong bond, which polymerization can be further accelerated by use of elevated temperatures, although use of elevated temperatures is not necessary since these compositions produce strong bonds within a matter of minutes.

The anaerobic polymerization of the compositions herein is accelerated by the surface of certain metals including iron, mild steel, cadmium, cobalt and manganese. Certain other metals, including aluminum and zinc have a lower catalytic activity. Non-metallic surfaces such as glass do not catalyze polymerization. In the bonding of surfaces of low catalytic activity, it may be advantageous to use a primer such as an aldehyde-amine condensate (e.g., those primers represented in U.S. Pat. No. 3,616,040 issued Oct. 26, 1971 to A. S. Toback) or a derivative of a catalyst metal such as ferric chloride, cobalt naphthanate or manganese resinate.

The following examples serve to illustrate further the embodiments of the present invention. In the examples, all parts and percentages are given by weight and all temperatures in degrees Celsius unless otherwise noted.

The following test procedures were employed in the examples below:

Determination of Shelf Stability (Gel Time)

A 5 cc. sample of the composition is added to a test tube, which is then placed in a bath heated to 82° C. for a minimum of 30 minutes. As an approximate correlation between oven-aging and aging at room temperature, it is believed that a sample still free from gelling after more than 24 hours of aging will be stable at ambient temperatures in the presence of oxygen for at least about one year.

Determination of Break Torque and Average Prevailing Torque

The strength of the bond between threaded members is determined as follows: About two or three drops of each composition are placed on the exposed threads of separate ⅜×24 mild steel Class II fit bolts (degreased), and immediately thereafter a nut (degreased) with mating threads is run onto the bolt so that the nut is directly in the thread area of the applied composition. The sealant is allowed to set and cure at room temperature for a specified period of time, normally 0.5, 1 to 24 hours, and the strength of the bond formed between the nut and bolt is then measured. The break torque for the bond is the amount of torque required for a wrench to remove the nut on the threads initially. The average prevailing torque for the bond is the average amount of torque required for a wrench to turn a series of three bolts for ¼ turn ½ turn, ¾ turn and a full turn. Commercially, a bolt sealant developing an average torque of 12 inch-pounds after 24 hours of cure is considered satisfactory.

Determination of the Tensile Shear and Impact Strength

These strength properties in the adhesive were determined according to the ASTM Standard Method of Test Designation D 950-72 (1973) for the impact strength and D 1002-72 (1973) for the tensile shear strength.

EXAMPLE I

This example describes the preparation of a N-mesyl-4-vinylbenzene sulfonamide, one of the polymerizable activators useful in the anaerobic formulations of the present invention.

A 2-liter multi-necked round bottom flask fitted with a mechanical stirrer (equipped with a glass stir rod and teflon paddle), reflux condenser, pressure equalizing addition funnel and thermometer was maintained under a sweep of argon. The system was vented to a trap containing 50% sodium hydroxide solution. The flask was charged with 626.4 g (5.4 mol) of chlorosulfonic acid, to this was added, dropwise, 200 g (1.08 mol) of phenyl ethyl bromide at such a rate as to maintain the reaction temperature below 27° C. with external ice-bath cooling. Upon complete addition, the mixture was stirred an additional hour and then cautiously poured over a large excess of ice to precipitate the crude sulfonyl chloride. Most of the ice water was decanted and the product dissolved in approximately one-liter of toluene. This toluene solution of 4-(2-bromethyl) benzenesulfonyl chloride was dried over anhydrous magnesium sulfate, filtered and used without further purification.

A 3-liter multi-necked round bottomed flask equipped as above was also maintained under a positive atmosphere of argon. The flask was charged with the toluene solution of 4-(2-bromoethyl) benzenesulfonyl chloride, cooled in an ice bath and 200 ml of 58% ammonium hydroxide introduced dropwise. Upon complete addition, the mixture was brought to between 50°–60° for 1.5 hrs. The mixture was cooled to room temperature and the crude sulfonamide collected and dried on a Buchner funnel to yield 264 g (1 mol, 93% based on phenyl ethyl bromide) of 4-(2-bromoethyl) benzenesulfonamide which was used without further purification.

A 500 ml multi-necked round bottomed flask equipped with a mechanical stirrer, thermometer, glass electrode connected to a suitable pH meter and two 60 ml pressure equalizing addition funnels, was charged with 200 ml of distilled water and 40 g (0.15 mol) of the crude 4-(2-bromoethyl)benzenesulfonamide. The slurry was cooled to 10° to 15° C. with an ice-water bath and sufficient 25% sodium hydroxide added from one of the addition funnels to bring the pH between 12 and 12.5. Through the second funnel, dropwise addition of 44 g (0.386 mol) methanesulfonyl chloride was introduced at such a rate as to maintain the temperature of the slurry between 10°–15° and concurrently 25% sodium hydroxide was added to maintain a pH of 12–12.5. Upon complete addition of the methanesulfonyl chloride, the slurry was stirred at 10° C. (pH 12) for ½ hour, brought to room temperature and made slightly acidic (pH 5) with concentrated hydrochloric acid. At this point any unreacted starting material was filtered and the filtrate cooled in an ice-water bath to 10° C. With vigorous stirring, the filtrate was made strongly acidic with concentrated hydrochloric acid, and the crude product collected on a Buchner funnel and dried in a vacuum oven at 50° C. overnight to give 40 g (0.12 mol), 80% yield based on 4-(2-bromoethyl) benzenesulfonamide of N-mesyl-4(2-bromoethyl) benzenesulfonamide.

A 500 ml multi-necked round bottomed flask fitted with a reflux condenser, thermometer and mechanical stirrer was then charged with 120 g (0.35 mol) of the crude N-mesyl-4(2-bromoethyl) benzenesulfonamide, 112.8 ml (0.70 mol) of 25% sodium hydroxide solution and 150 ml of distilled water. The solution was heated to 70° C. for ¾ hr., cooled in an ice-water bath to approximately 10° C. and then made strongly acidic with concentrated hydrochloric acid. The resulting mixture was stirred for 1 hour and the precipitated product collected by filtration. The crude product, 78 g (0.30 mol) of N-mesyl-4-vinylbenzenesulfonamide was dissolved in warm toluene (ca. 55° C.), filtered to removed insolubles, and allowed to crystallize at freezer temperatures to yield 45 g (0.17 mol, 50%) pure monomer having a melting point of 98°-100° C. and a neutralization equivalent of 259.92 (theory 261); the elemental analysis and the calculated composition of $C_9H_{11}NO_4S_2$ are given below:

| Compn. by % | C | H | N | S |
|---|---|---|---|---|
| Analysis | 41.08 | 4.41 | 5.19 | 23.47 |
| Calculation | 41.38 | 4.21 | 5.36 | 24.52 |

EXAMPLE II

This example describes the preparation of an anaerobic adhesive formulation using the monomeric activator of Example I. The adhesive was evaluated using the testing procedures previously described. A 500 ml. high density polyethylene beaker, was charged with 82.4 parts tetraethyleneglycol dimethacrylate and 15.0 parts hydroxyethyl methacrylate were added with stirring. The temperature was raised to 75°-80° C. The mixture was maintained at this temperature for 2 hr., and then 100 ppm of tetrasodium salt of ethylenediamine tetraamine (Na$_4$EDTA) dissolved in methanol-water (5% solution) were added. The temperature was lowered to 60°-65° C. and 2.1 parts N-mesyl-4-vinylbenzenesulfonamide were added. The mixture was held for 1 hr., and 0.54 parts N,N-dimethyl toluidine were added slowly in increments of 0.2 part every 30 min. The mixture was held overnight after the addition was completed; then 3 parts cumene hydroperoxide were added. The resulting anaerobic adhesive formulation was cooled to room temperature and discharged to a 500 ml. polyethylene bottle.

Test results were as follows:

|  | 60 min. | 24 hrs. |
|---|---|---|
| Break Torque (in. lb.) | 25 | 58 |
| Prevailing Torque (in. lb.) | 144 | 250 |
| Gel Time >70 min. | | |

EXAMPLE III

Using procedures similar to that described in Example II, other anaerobic formulations were prepared using the components and amounts indicated in Table I.

Testing results for the formulations are shown in Table II.

TABLE I

| Components | Formulations | | | | |
|---|---|---|---|---|---|
|  | A | B | C | D | E |
| Polyurethane Dimethacrylate | 91.8 | — | — | — | — |
| Tetraethyleneglycol Dimethacrylate | — | 93.25 | 94 | 93.85 | 88.5 |
| N—mesyl-4-vinyl-benzenesulfonamide | 2.36 | 3 | 3 | — | 2.5 |
| N-benzenesulfonyl-4-vinyl-benzenesulfonamide | — | — | — | 2.5 | — |
| N,N—Dimethyl-p-toluidine | 0.6 | 0.75 | — | 0.63 | — |
| EDTA | 100 ppm | 100 ppm | 100 ppm | 100 ppm | 100 ppm |
| Methacrylic acid | 5 | — | — | — | — |
| Adhesive agent | 0.3 | — | — | — | — |
| Cumene Hydroperoxide | — | 3 | 3 | 3 | 3 |
| Thickener | — | — | — | — | 6.0 |

TABLE II

| | Formulations | | | | |
|---|---|---|---|---|---|
|  | A | B | C | D | E |
| Tensile Shear (pis) | 3232 | * | * | * | * |
| Impact Strength (ft. lbs.) | 9.5 | * | * | * | * |
| Break Torque (in. lbs.) | | | | | |
| 30 min. | * | 50 | * | 42 | * |
| 60 min. | * | 92 | * | 83 | * |
| 24 hrs. | * | 92 | 92 | 100 | 117 |
| Prevailing Torque | | | | | |
| 30 min. | * | 122 | * | 229 | * |
| 60 min. | * | 244 | * | 338 | * |
| 24 hrs. | * | 304 | 119 | 306 | 110 |
| Gel Times (minutes) | 50–60 | >60 | >60 | >60 | 55–60 |

*Not measured.

Now that the preferred embodiments of the present invention have been described in detail, various modifications and improvements thereon will become readily apparent to those skilled in the art. Accordingly the spirit and scope of the invention are to be limited only by the appended claims and not by the foregoing specifications.

What is claimed is:

1. An anaerobic curing adhesive composition consisting essentially of:
   (a) at least one polymerizable acrylate or methacrylate monomer;
   (b) a free radical initiator in sufficient concentration to initiate cure upon the exclusion of oxygen; and
   (c) a polymerizable activator therefor comprising a monomeric disulfonimide present in an amount of 0.01 to 12% by dry weight of the total composition selected from the general formula:

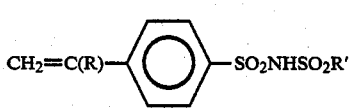

wherein R is hydrogen or methyl, and R' is alkyl, aryl, toluene or mesitylene; and wherein the acrylate or methacrylate monomer of component (a) is a member of the compounds corresponding to:

(i) 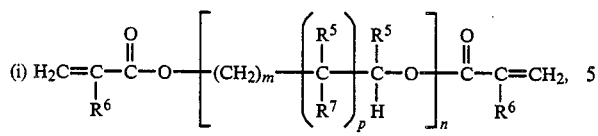

where $R^5$ is H, CH$_3$, C$_2$H$_5$, CH$_2$OH, or CH$_2$—O—C(=O)—C(R$^6$)=CH$_2$; $R^6$ is H, Cl, CH$_3$ or C$_2$H$_5$; $R^7$ is H, OH, or O—C(=O)—C(R$^6$)=CH$_2$; m is 1-8; n is 1-20; and p is 0-1; or (ii) 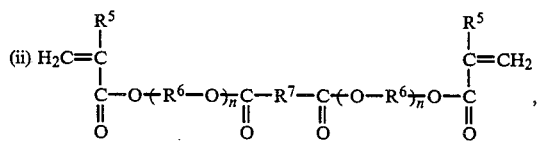

where $R^5$ is H, Cl, CH$_3$, or C$_2$H$_5$; $R^6$ is a C$_2$-C$_6$ alkylene; $R^7$ is (CH$_2$)$_m$,

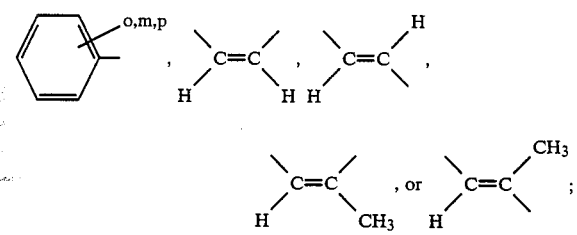

n is 1-4; and m is 0-8; or (iii) 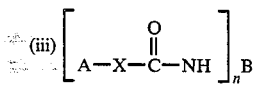

where X is O or N(R$^5$); $R^5$ is H or a C$_1$-C$_7$ alkyl; A represents the organic residue of an active-hydrogen-containing acrylate ester wherein the active hydrogen has been removed, the ester being hydroxy- or amino substituted on the alkyl portion thereof and the methyl, ethyl, and chlorine homologs thereof; B is a mono- or polyvalent organic radical selected from the group consisting of alkyl, alkylene, alkenyl, alkenylene, cycloalkyl, cycloalkylene, aryl, arylene, aralkyl, aralkylene, alkaryl, alkarylene, poly(oxyalkylene), poly(carboalkoxyalkylene), and heterocyclic radicals both substituted and unsubstituted; and n is 1-6; or (iv) 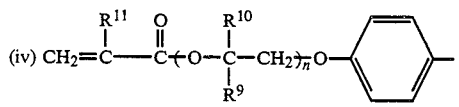

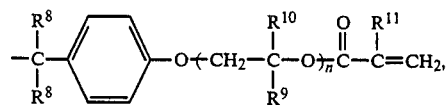

where $R^8$ is CH$_3$, C$_2$H$_5$, COOH, or H; $R^9$ is H, CH$_3$, or C$_2$H$_5$, $R^{10}$ is H, CH$_3$, or OH; $R^{11}$ is H, Cl, CH$_3$, or C$_2$H$_5$, and n is 0-8; and monofunctional acrylate and methacrylate esters or the hydroxy, amido, cyano, chloro, or silane substituted derivatives thereof.

2. The composition of claim 1, further comprising a stabilizer of free radical polymerization, an auxiliary accelerator for free radical polymerization, a chelator, or mixtures thereof.

3. The composition of claim 1 wherein said polymerizable acrylate or methacrylate monomer is a polyfunctional acrylate or methacrylate ester having the formula

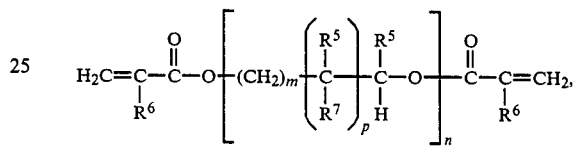

wherein $R^5$ is H, CH$_3$, C$_2$H$_5$ or CH$_2$OC(=O)C(R$^6$)=CH$_2$; $R^6$ is H, Cl, CH$_3$, or C$_2$H$_5$; $R^7$ is H, OH, or OC(=O)C(R$^6$)=CH$_2$; m is an integer from 1 to 8; n is an integer from 1 to 20; and p is 0 or 1.

4. The composition of claim 1 wherein said polymerizable acrylate or methacrylate monomer corresponds to the formulas:

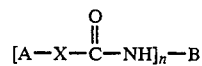

where X is O or N(R$^5$); $R^5$ is H or a C$_1$-C$_7$ alkyl; A represents the organic residue of an active-hydrogen-containing acrylate ester wherein the active hydrogen has been removed, the ester being hydroxy- or amino-substituted on the alkyl portion thereof and the methyl, ethyl, and chlorine homologs thereof; B is a mono- or polyvalent organic radical selected from the group consisting of alkyl, alkylene, alkenyl, alkenylene, cycloalkyl, cycloalkylene, aryl, arylene, aralkyl, aralkylene, alkaryl, alkarylene, poly(oxyalkylene), poly(carboalkyoxyalkylene), and heterocyclic radicals both substituted and unsubstituted; and n is 1-6.

5. The composition of claim 1, wherein R' of said polymerizable activator is C$_{1-4}$ alkyl.

6. The composition of claim 1, wherein R' of said polymerizable activator is benzene or toluene.

7. The composition of claim 1, wherein R of said polymerizable activator is hydrogen and R' is methyl or benzene.

8. The composition of claim 1, further comprising acrylic and/or methacrylic acid present in an amount from about 0.5 to 10% by weight, based on the total composition weight.

* * * * *